March 10, 1925.
W. F. GROENE
1,528,972
LATHE OF THE TYPE GENERALLY REFERRED TO AS CRANK SHAFT LATHE
Filed Jan. 2, 1923 4 Sheets-Sheet 1
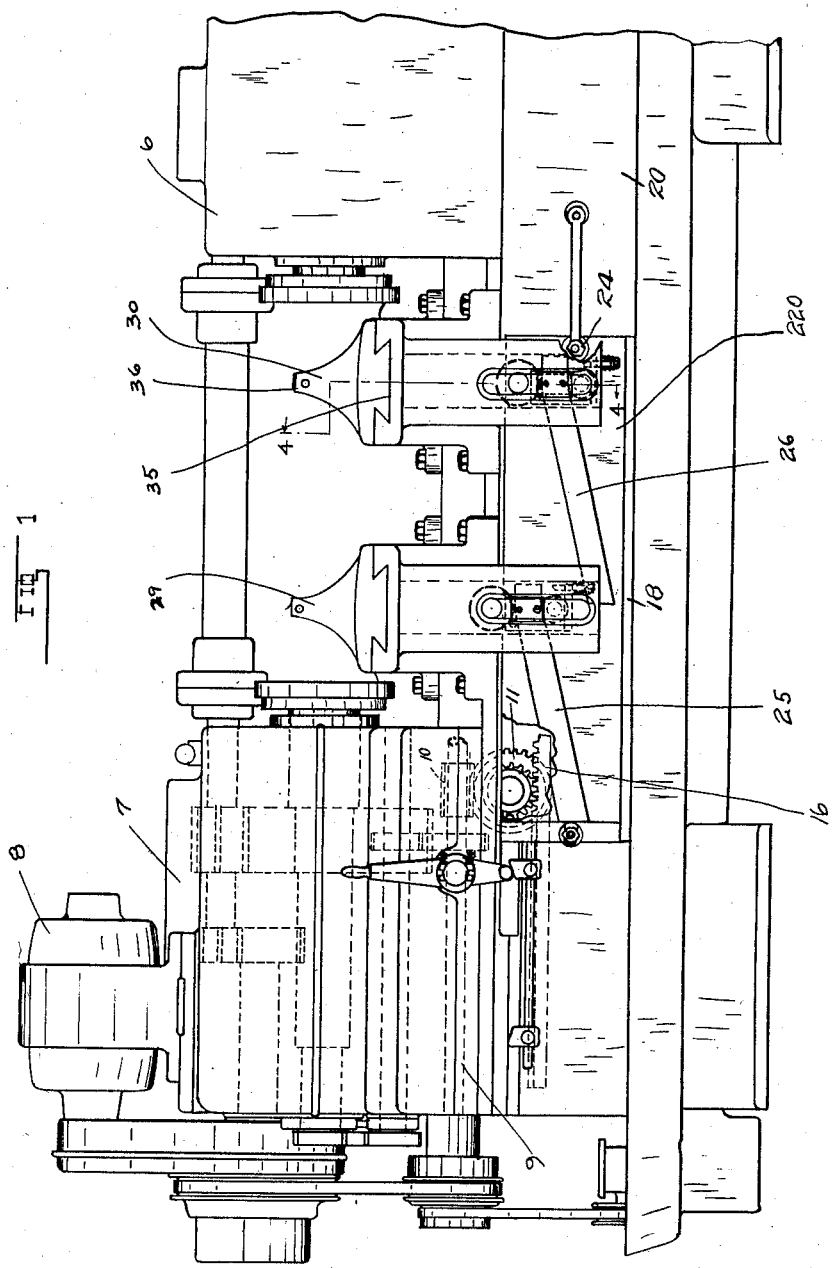
Inventor
William F. Groene
By Walter F. Murray
Attorney

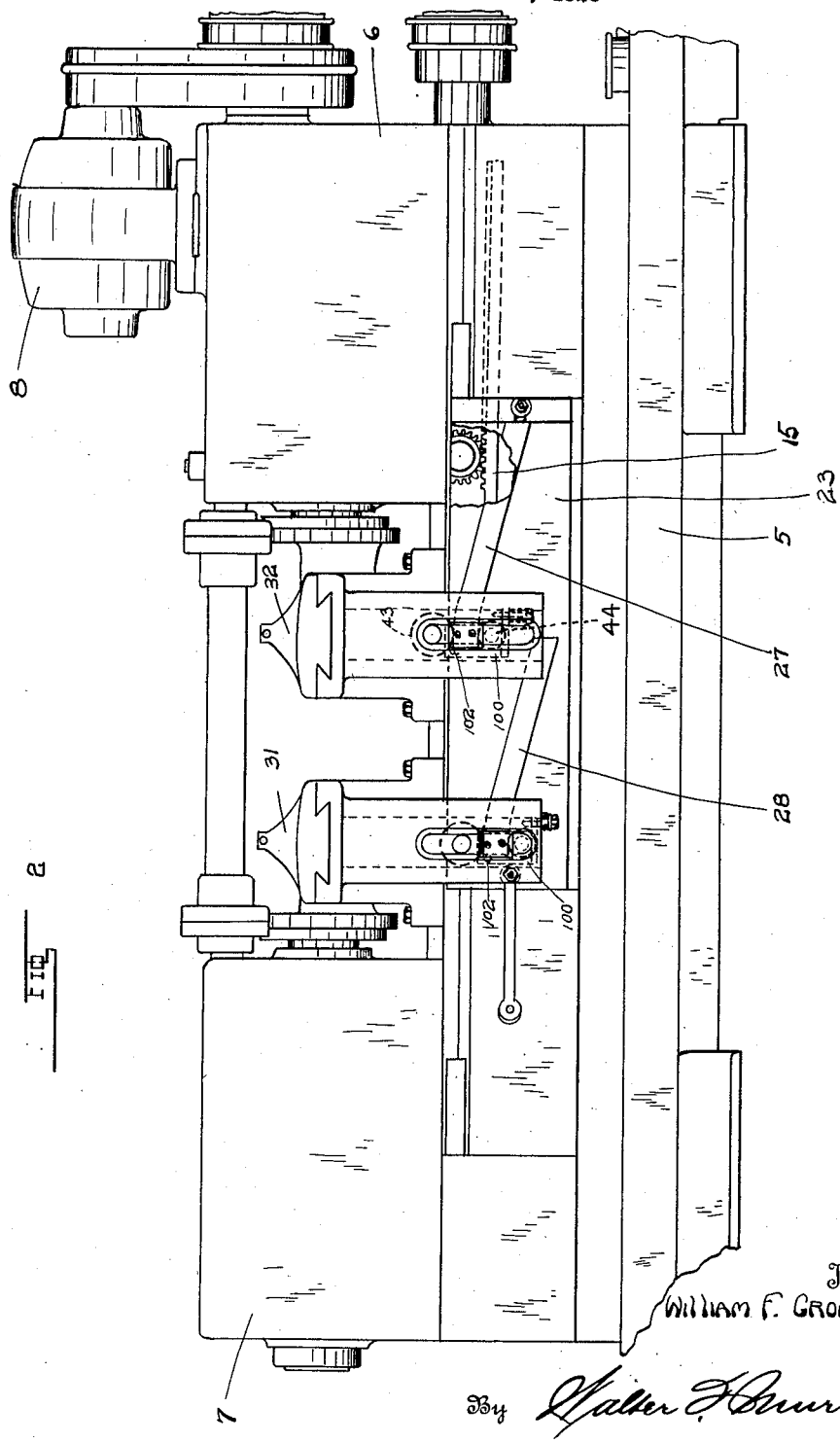

March 10, 1925.
W. F. GROENE
1,528,972
LATHE OF THE TYPE GENERALLY REFERRED TO AS CRANK SHAFT LATHE
Filed Jan. 2, 1923
4 Sheets-Sheet 3
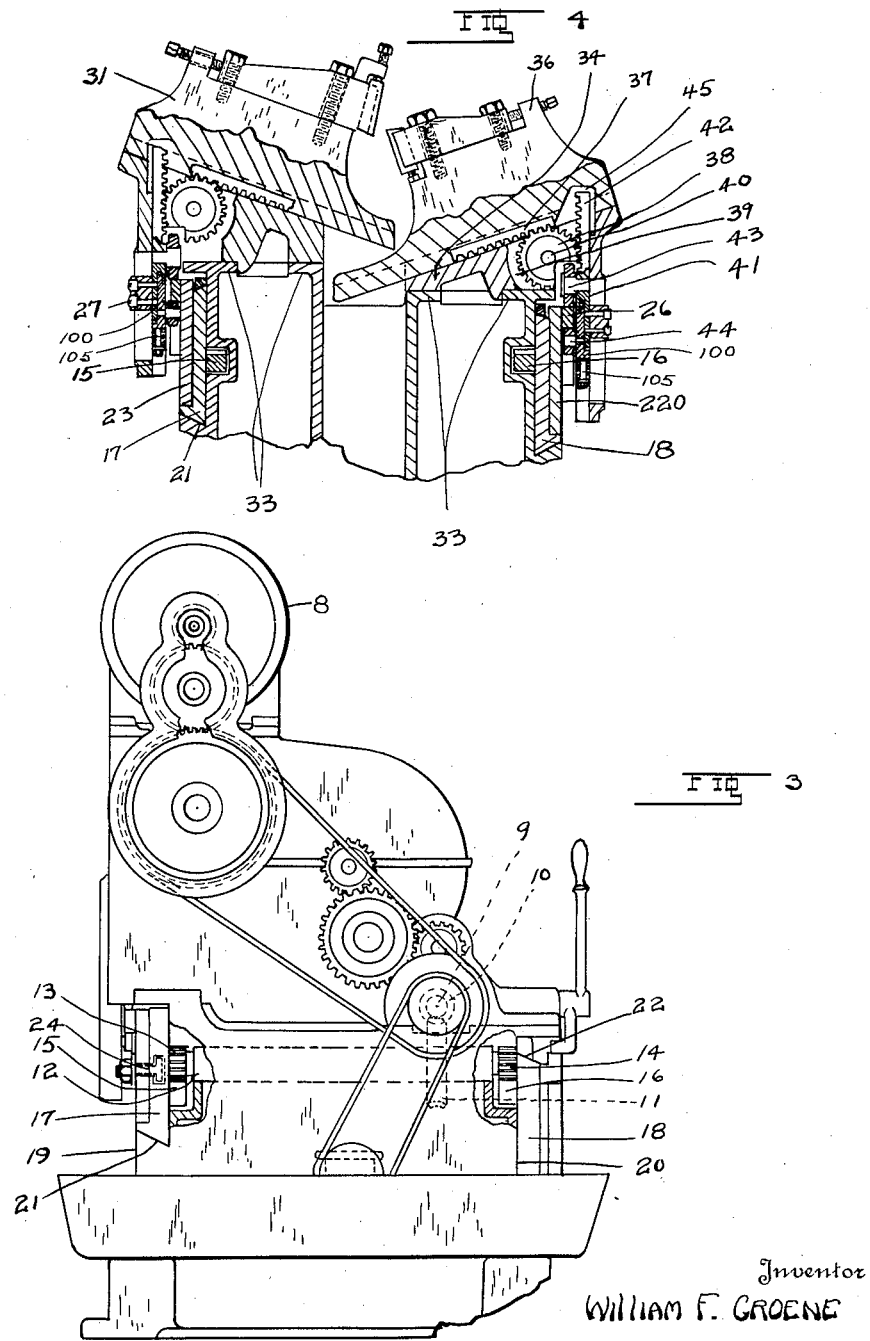
Inventor
WILLIAM F. GROENE
By Walter F. Murray
Attorney March 10, 1925.
W. F. GROENE
1,528,972
LATHE OF THE TYPE GENERALLY REFERRED TO AS CRANK SHAFT LATHE
Filed Jan. 2, 1923
4 Sheets-Sheet 4
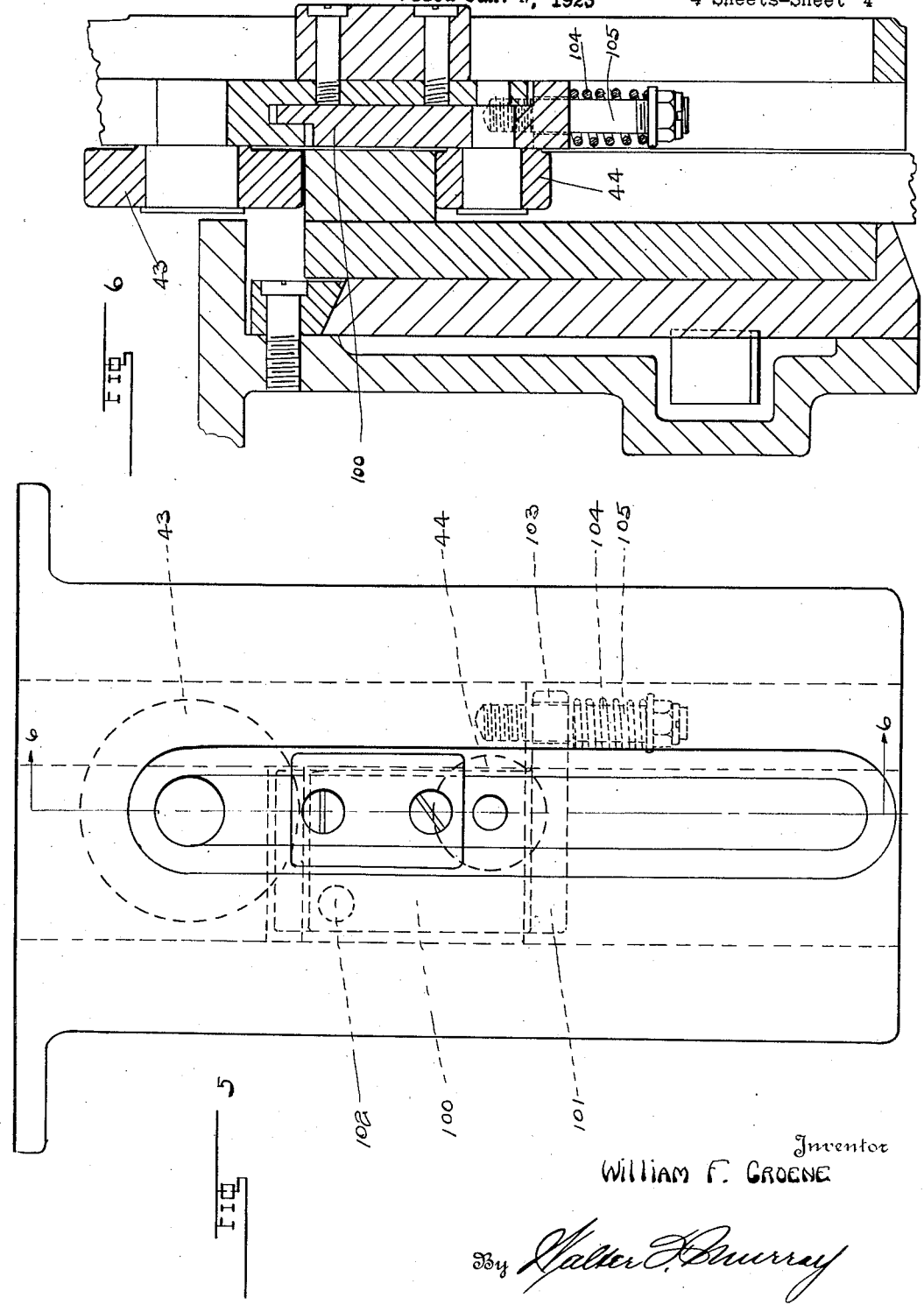
Inventor
WILLIAM F. GROENE
By Walter F. Murray
Attorney Patented Mar. 10, 1925.

1,528,972

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

LATHE OF THE TYPE GENERALLY REFERRED TO AS CRANK-SHAFT LATHE.

Application filed January 2, 1923. Serial No. 610,160.

*To all whom it may concern:*

Be it known that I, WILLIAM F. GROENE, a citizen of the United States of America, and a resident of Cincinnati, in the county of Hamilton and State of Ohio, have invented a new and useful Improvement in Lathes of the Type Generally Referred to as Crank-Shaft Lathes, of which the following is a specification.

My invention relates to lathes of the type referred to as crank shaft lathes, although it may be extended and applied to other types of lathes.

An object of my invention is to provide a device for automatically controlling the transverse feed of a cutting tool.

Another object of my invention is to provide a simple and efficient device for the purpose stated.

Another object of my invention is to provide a device having minimum parts, and having its elements so related that a minimum of wear will result.

Another object of my invention is to provide a device of a type referred to wherein the transverse feed may be quickly and simply modified and controlled.

These and other objects are attained by the means described herein and disclosed in the accompanying drawings in which—

Fig. 1 is a front elevation of a device embodying my invention.

Fig. 2 is a rear elevation of the device shown in Fig. 1.

Fig. 3 is a fragmental end elevation of device shown in Fig. 1.

Fig. 4 is a fragmental sectional view on line 4—4 of Fig. 1.

Fig. 5 is an elevation of a tool support.

Fig. 6 is a sectional view on the line 6—6 of Fig. 5.

The lathe of my invention comprises suitable base 5 carrying at its opposite ends a head stock 7 and a tail stock 6. The head-stock carries a motor 8 and suitable power transmitting means such as the gears and pulleys disclosed in Fig. 3, whereby power may be transmitted to the longitudinally extending shaft 9. The shaft 9 carries a worm 10, in engagement with a worm wheel 11 mounted on the transversely extending shaft 12 carried by the bed. The shaft 12 carries at its opposite ends the gears 13 and 14 in engagement with racks 15 and 16 respectively. The racks 15 and 16 are carried by plates 17 and 18 respectively, slidably mounted upon the rear and forward side faces 19 and 20 respectively of the lathe bed.

The slidable mounting provided for the plates 17 and 18 may be of any structure, for example the bed may be provided with longitudinally extending ways 21 and 22, of dovetailed construction, in which the plates 17 and 18 are contained. The plates have mounted upon them detachable cam plates 220 and 23. The cam plates may be secured upon sliding plates 17 and 18, by any means such as the clamping bolts and nuts 24. The cam plates carry cams or contour bars, 25, 26, 27, and 28. The bars 25, 26, 27 and 28 are engaged by rollers carried by the tool supports 29, 30, 31 and 32, and control the movement of the tool supports.

The several structures whereby the tool supports are controlled, are substantially identical in structure, wherefore a description of one will suffice for all. The tool supports may be bolted upon the rails or ways 33, of the bed as is common in the art. Each tool support comprises a base 34 having formed in it a way 35 in which is slidably mounted a tool holder 36. The tool holder has formed in its lower face a rack 37, the teeth of the rack being engaged by a pinion 38, revolvably carried by the base 34 in a pocket 39 formed in the base. A suitable shaft 40 extending through the pocket supports the pinion 38. The base 34 has formed in it a way 41 in which is slidably contained a rack bar 42 engaging the pinion 38. The rack bar 42 carries rollers 43 and 44 adapted to lie upon opposite sides of the cam 26 and to engage the opposite sides of the cam 26. The tool holder is provided with a recess 45 into which the rack bar 42 may enter. A plate 100 is pivotally mounted on the rack bar 42 by pivot 102. The plate 100 has at its lower end 101 a lateral extension 103 which engages a spring 104 mounted upon a bolt 105 which bolt is screwed into the rack bar 42. Therefore, the wear resulting from engagement of the cam 26 with the rollers 43 and 44 is compensated for by the action of the spring and the movement of the plate 100 about its pivotal mounting. From the foregoing it will be apparent that as a cam plate is moved longitudinally of the lathe bed, the tool holder will be actuated toward or away from work carried by the lathe. The contour of cams 26, will determine the rate and extent of movement of the tool holder. When it is desired to change the range of work of the tool holder, the plate carrying the cams, namely plates 22 and 23 are detached from the slides 17 and 18 and other cam plates bearing other cam bars or contour bars are mounted upon the slides.

The operation of my device is as follows:

Motion is transmitted from the motor 8 to the shaft 9. The shaft 9 in turn revolubly actuates the shaft 12 carrying gears 13 and 14, through which gears motion is imparted to the racks 15 and 16 and slides 17 and 18, said slides being moved longitudinally of the lathe bed. The movement of the slide is imparted to the cams or contour bars, and the engagement of the rollers carried on the vertical racks 42, upon the cam or contour bars serves to actuate the pinion 38. The pinion in turn actuates the tool holder. It should be noted that by providing the cams or contour bars with an upper portion having its upper and lower edges extending in parallelism with the line of movement of the slide, the feed of the tool holder is checked. By applying my invention, various tool holders may be caused to complete their work prior to other parts of the machine, yet, the machine may be continued in operation until the work of all of the tools and tool holders on a given piece of material has been completed.

By so arranging the stock and the tool holders that work is done upon the stock on opposite sides thereof at substantially the same time, the stock is not distorted and is not subject to springing as is the case when but one cutting tool is working on the stock.

What I claim is:

1. In a lathe the combination of a bed having a way along its front and a way along its rear, the one way being higher than the other way, a carriage mounted on each way and having an inclined upper face, both said faces inclining downwardly toward the longitudinal center of the bed and having substantially the same inclination to the horizontal, a tool support reciprocally mounted on each inclined face and each provided with an extension projecting centerward, the projection on the one support being adapted to overhang the projection on the other support, whereby the tool supports may be moved to approximately the center of work and on oppposite sides of the work without interference with one another.

2. In a lathe the combination of a bed having a way along its forward face and a way along its rear face, said ways being spaced from one another longitudinally of the bed whereby to provide an opening between said ways, a carriage mounted on each way, a tool support reciprocally mounted on each carriage, each carriage and its respective tool support being arranged for reciprocation of the tool support in an inclined plane extending downwardly toward the opening between the ways, the tool supports being provided with extensions for discharging cuttings into the way, and one tool support being so positioned that it will over-hang the other tool support whereby to permit movement of the tool supports past one another when both extensions overhang the opening between the ways.

3. In a lathe the combination of a bed having a way along its forward face and a way along its rear face, said ways being spaced from one another longitudinally of the bed whereby to provide an opening between said ways, a carriage mounted on each way, a tool support reciprocally mounted on each carriage, each carriage and its respective tool support being arranged for reciprocation of the tool support in an inclined plane extending downwardly toward the opening between the ways, the tool supports being provided with extensions for discharging cuttings into the way, and one tool support being so positioned that it will over-hang the other tool support whereby to permit movement of the tool supports past one another when both extensions over-hang the opening between the ways, and means for reciprocating the tool supports.

In testimony whereof, I have hereunto subscribed my name this 27th day of December, 1922.

WILLIAM F. GROENE.